March 4, 1930. D. H. GROENEWOLD 1,749,341
ADJUSTING BOLT
Filed Feb. 7, 1927
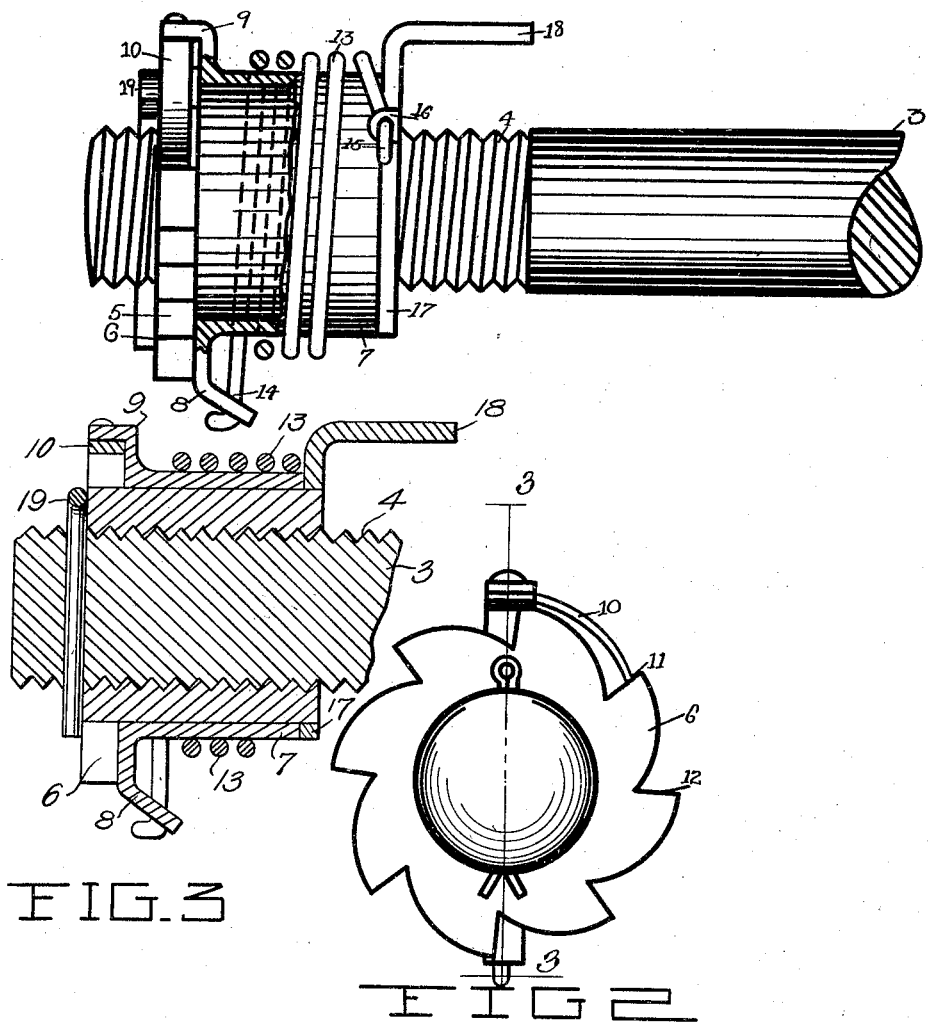
INVENTOR.
D. H. Groenewold.

Patented Mar. 4, 1930

1,749,341

UNITED STATES PATENT OFFICE

DICK H. GROENEWOLD, OF LOYAL, OKLAHOMA

ADJUSTING BOLT

Application filed February 7, 1927. Serial No. 166,492.

The invention relates generally to self-tightening bolts, and specifically to that type of self-tightening or wear-compensating bolts having means for automatically advancing a wear-compensating member on the bolt-threads to retain a snug co-operation between the parts connected by means of the bolt.

The general purpose of the invention is to provide a wear-compensating bolt peculiarly adapted to compensate for irregular wear of the parts with which it is associated. In pursuance of this general purpose, the prime object of the invention is to provide an automatic self-tightening bolt construction particularly applicable for use on connecting rod bearings of a crankshaft, which will compensate for wear of the bearings, but will yield to varying pressures of the bearings, caused by the unevenness of wear on the shaft to the extent necessary to prevent undue stiffness of the motor and to avoid excessive friction.

Another object of the invention is to provide means for conveniently assembling the individual units of the device and which, in a simple and an efficient manner, will enable application of the desired degree of tension to the nut tightening spring.

Other advantages will become apparent upon perusal of the specification, drawings and the appended claims.

On the drawings, accompanying and forming a part of the specification herewith,

Figure 1 is an elevation view of a fragmented bolt, with invention applied.

Figure 2 is an end view thereof.

Figure 3 is a sectional view taken approximately on the line 3—3 of Figure 2.

Similar characters of reference will indicate like parts throughout.

The bolt 3 may be used in any capacity, in any position, and under any circumstances, in the single or plural, for instance, in connection with crank head bearing, where, of course, two of them will be employed to secure the cap of the bearing in place.

This bolt is threaded at 4 and upon these threads is screwed a bushing 5, otherwise called a nut, and to this bushing or nut 5, is integrally formed a series of teeth 6, radially disposed about the periphery of the rim formed as a part of the nut or bushing 5.

Upon this bushing-nut 5, is slipped a hollow shell 7, provided with a lug 8, and a bearing 9, the latter forming an arbor for the attachment of a pawl 10, preferably curved as seen in Figure 2 so that its extremity 11 will have a direct and positive bearing against the wall 12 of the teeth 6 for the purpose of generating positive action in practice.

About the body or exterior of the shell 7 is convoluted a coil spring 13, one end of which is anchored at 14 into the lug 8, and the other end 15 will be secured into the lug 16 of a ring 17 that rides upon the extension of the bushing-nut 5 beyond the shell 7, this extension being sufficiently substantial to provide a positive bearing for this element 17. This ring 17 is provided with a laterally extending arm 18 that may be suitably positioned against any suitable abutment or part of bearing so as to prevent it from turning, after once being set in place.

Observe that after the parts have been put in place, a cotter-key 19 is passed through the bolt 3 to prevent the loss of parts.

We now turn to the statement of operation, the benefits thereof and reasons therefor.

Let it be borne in mind that it is an object of the invention to provide for reaching to the device freely with the hand for adjustments and take-up, without interference of any additional parts or removals thereof.

The use and operation follows:

To obtain a proper degree of stress in a convenient, and desirable manner, the bushing nut 5 is revolved clockwise upon the bolt 3, or vice versa the shell 7 may be forced anti-clock-wise with the hand, until the parts are properly in place, position, and ready for efficient action. During this important operation the tension of the resilient member 13 is relatively changed to an efficient operating state, it being understood, of course, that in the meanwhile, the arm 18 is now bearing against any suitable part (not shown) in connection with the part through which the bolt is being used. The parts thus named may be assembled before application to the bolt, or may be placed in position in the order as shown.

As stated above, the device is used with a crankshaft bearing or some similar means. The tendency of the spring 13 is to impart rotation to the sleeve 7 and through pawl 10 to the nut 5 in such direction as to advance the nut on the bolt 3 and compensate for the wear on the parts held by the bolt.

Having thus described this invention, I claim:

1. A device of the class described comprising in combination, a threaded bolt, a nut threaded thereon, ratchet teeth arranged circumferentially of the nut at one end thereof, a sieeve surrounding the nut, a pawl carried by the sleeve at one end thereof for engagement with the ratchet teeth, a ring encircling the nut for disposition against the other end of the sleeve, a stop forming member carried by and extending laterally from the ring, a coil spring encircling the sleeve and being connected at its ends to the ring and the remote end of the sleeve respectively, and means disposed through the bolt to retain the nut thereon.

2. In a device of the class described, a threaded bolt, a nut threaded thereon, ratchet teeth arranged circumferentially at the outer end of the nut, a sleeve surrounding the nut, a pawl carried by the outer end of the sleeve for co-operation with the ratchet teeth, the inner end of the sleeve terminating inwardly of the adjacent end of the nut, a ring surrounding the inner end portion of the nut for disposition against the adjacent end of the sleeve, a stop forming member carried by the ring, and a coil spring encircling the sleeve and connected at one end to the ring and at its other end to the outer end portion of the sleeve, as and for the purposes described.

3. In a device of the class described, a threaded bolt, a nut threaded thereon, ratchet teeth arranged circumferentially at the outer end of the nut, a sleeve surrounding the nut, a pawl carried by the outer end of the sleeve for co-operation with the ratchet teeth, the inner end of the sleeve terminating inwardly of the adjacent end of the nut, a ring surrounding the inner end portion of the nut for disposition against the adjacent end of the sleeve, a stop forming member carried by the ring, apertured lugs extending laterally from the outer end portion of the sleeve and the ring respectively, a coil spring encircling the sleeve, the ends thereof being disposed through and connected to the respective apertured lugs, and a cotter-pin extending through the outer end of the bolt for engagement with the outer end of the nut.

4. A device of the class described comprising a threaded bolt, a nut threaded thereon, ratchet teeth arranged circumferentially at the outer end of the nut, a sleeve surrounding the outer end portion of the nut, an angular bracket extending laterally from the outer end portion of the sleeve, a pawl carried by the bracket for co-operation with the ratchet teeth, an apertured lug extending laterally from the outer end portion of the sleeve, a ring surrounding the inner end portion of the nut, an angular stop forming arm extending from the periphery of the ring, an apertured lug projecting radially from the ring, a coil spring encircling the sleeve, said spring having its ends disposed through and connected to the respective apertured lugs to maintain the movable parts in a predetermined manner, and a cotter-pin extending through the outer end of the bolt for disposition against the outer end of the nut.

In witness whereof I have hereunto set my hand, this 24th day of January, in the year of our Lord, nineteen hundred and twenty-seven.

D. H. GROENEWOLD.